US012594879B2

(12) United States Patent
Flores

(10) Patent No.: US 12,594,879 B2
(45) Date of Patent: Apr. 7, 2026

(54) EMERGENCY VEHICLE LIGHTING SYSTEM

(71) Applicant: William Flores, Buena Park, CA (US)

(72) Inventor: William Flores, Buena Park, CA (US)

( * ) Notice: Subject to any disclaimer, the term of this patent is extended or adjusted under 35 U.S.C. 154(b) by 65 days.

(21) Appl. No.: 18/414,981

(22) Filed: Jan. 17, 2024

(65) Prior Publication Data

US 2025/0229704 A1 Jul. 17, 2025

(51) Int. Cl.
| | |
|---|---|
| *B60W 50/08* | (2020.01) |
| *B60Q 1/00* | (2006.01) |
| *B60Q 1/26* | (2006.01) |
| *B60Q 1/52* | (2006.01) |
| *B60W 50/14* | (2020.01) |
| *F21S 9/02* | (2006.01) |
| *F21S 9/03* | (2006.01) |
| *G07C 5/00* | (2006.01) |
| *G08B 21/00* | (2006.01) |
| *F21W 107/10* | (2018.01) |
| *F21Y 103/10* | (2016.01) |
| *F21Y 115/10* | (2016.01) |

(52) U.S. Cl.
CPC ............. *B60Q 1/52* (2013.01); *B60Q 1/0088* (2013.01); *B60Q 1/2611* (2013.01); *F21S 9/022* (2013.01); *F21S 9/032* (2013.01); *B60Q 2400/10* (2013.01); *B60Q 2400/20* (2013.01); *F21W 2107/10* (2018.01); *F21Y 2103/10* (2016.08); *F21Y 2115/10* (2016.08)

(58) Field of Classification Search
CPC ...... B60Q 1/52; B60Q 1/0088; B60Q 1/2611;

B60Q 2400/10; B60Q 2400/20; F21S 9/022; F21S 9/032; F21Y 2103/10; F21Y 2115/10; F21W 2107/10

See application file for complete search history.

(56) References Cited

U.S. PATENT DOCUMENTS

| | | | | |
|---|---|---|---|---|
| 5,255,164 A | * | 10/1993 | Eidelman | ............. B60Q 1/2611 |
| | | | | 362/540 |
| 6,188,317 B1 | * | 2/2001 | Wang | ..................... B60Q 1/302 |
| | | | | 340/471 |
| 7,621,662 B1 | | 11/2009 | Colbert | |
| 8,421,811 B2 | * | 4/2013 | Odland | ..................... G09F 9/33 |
| | | | | 345/589 |

(Continued)

FOREIGN PATENT DOCUMENTS

| | | | |
|---|---|---|---|
| DE | 19722292 A1 | * 12/1998 | ............. E01F 9/662 |
| WO | WO2018223450 | 12/2018 | |

*Primary Examiner* — Quang Pham

(57) ABSTRACT

An emergency vehicle lighting system for increased concealment and improved illumination of emergency vehicles includes a motor vehicle having a perimeter wall including a rooftop. The motor vehicle has an interior bounded by the perimeter wall. A lighting assembly is coupled to the rooftop. The lighting assembly has a first setting comprising a first color that is emitted from the lighting assembly, a second setting comprising a second color and a third color that is emitted from the lighting assembly, and a third setting comprising a fourth color that is emitted from the lighting assembly. A control panel is coupled to the vehicle and operationally coupled to the lighting assembly. The control panel is actuated to select the first setting, the second setting, or the third setting of the lighting assembly. The control panel is positioned within the interior space.

1 Claim, 5 Drawing Sheets

(56)                    References Cited

U.S. PATENT DOCUMENTS

| | | | | |
|---|---|---|---|---|
| 8,585,263 | B2 * | 11/2013 | Shipman | B60Q 1/503 |
| | | | | 362/540 |
| D709,227 | S | 7/2014 | Huang | |
| 9,688,185 | B2 * | 6/2017 | Fisher | B60Q 1/0035 |
| 9,868,387 | B2 * | 1/2018 | Salter | F21S 43/14 |
| 9,902,315 | B2 * | 2/2018 | Salter | B60Q 1/346 |
| 10,137,828 | B1 * | 11/2018 | Takae | B60Q 1/507 |
| 10,246,005 | B2 * | 4/2019 | Shipman | F21V 9/06 |
| 10,421,393 | B2 * | 9/2019 | Crews | F21S 41/153 |
| 10,556,536 | B2 * | 2/2020 | Shipman | G09F 21/042 |
| 10,920,950 | B1 * | 2/2021 | Glickman | B60Q 3/30 |
| 10,946,792 | B2 | 3/2021 | Shipman | |
| 11,267,400 | B2 | 3/2022 | Zhang | |
| 11,560,087 | B1 * | 1/2023 | Hartenstein | B60Q 1/0483 |
| 11,560,089 | B2 * | 1/2023 | Hallundbæk | B60J 1/08 |
| 2007/0217212 | A1 * | 9/2007 | Klinkman | B60R 9/04 |
| | | | | 362/493 |
| 2007/0219720 | A1 * | 9/2007 | Trepagnier | G05D 1/024 |
| | | | | 701/300 |
| 2009/0116257 | A1 * | 5/2009 | Rosemeyer | B60Q 1/2611 |
| | | | | 250/504 R |
| 2009/0161377 | A1 * | 6/2009 | Helms | B60Q 1/247 |
| | | | | 362/493 |
| 2009/0256697 | A1 * | 10/2009 | Tallinger | B60Q 1/50 |
| | | | | 340/472 |
| 2010/0194556 | A1 | 8/2010 | LaRosa | |
| 2011/0167689 | A1 * | 7/2011 | Ford | G09F 3/08 |
| | | | | 40/542 |
| 2011/0260470 | A1 * | 10/2011 | Ahmadi | B60H 1/00428 |
| | | | | 290/55 |
| 2012/0018474 | A1 * | 1/2012 | Lindberg | B60Q 1/544 |
| | | | | 362/459 |
| 2012/0224383 | A1 * | 9/2012 | Shipman | B60Q 1/544 |
| | | | | 362/493 |
| 2013/0057064 | A1 * | 3/2013 | Xiong | H02J 9/06 |
| | | | | 307/10.1 |
| 2013/0092965 | A1 * | 4/2013 | Kijima | H10H 20/8513 |
| | | | | 257/98 |
| 2013/0179035 | A1 * | 7/2013 | Adachi | B60Q 1/5035 |
| | | | | 701/36 |
| 2015/0239390 | A1 * | 8/2015 | Oliverio | B60R 13/005 |
| | | | | 340/461 |
| 2015/0251592 | A1 * | 9/2015 | Fisher | B60Q 1/0035 |
| | | | | 362/548 |
| 2016/0236613 | A1 * | 8/2016 | Trier | B60R 13/04 |
| 2017/0297482 | A1 * | 10/2017 | Salter | B60Q 1/2696 |
| 2019/0047466 | A1 * | 2/2019 | Crews | F21S 43/14 |
| 2019/0070999 | A1 * | 3/2019 | Shipman | B60Q 1/2611 |
| 2020/0156532 | A1 * | 5/2020 | Lee | B60Q 1/543 |
| 2020/0262337 | A1 * | 8/2020 | Hartenstein | H05K 1/0231 |
| 2023/0402665 | A1 * | 12/2023 | Han | H02J 7/35 |

* cited by examiner

EMERGENCY VEHICLE LIGHTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable stealth

BACKGROUND OF THE INVENTION

(1) Field of the Invention

The disclosure relates to vehicle lighting systems and more particularly pertains to a new vehicle lighting system for increased concealment of an emergency vehicle, such as a police car, when the lighting system is deactivated and for improved illumination of the emergency vehicle when the lighting system is activated.

(2) Description of Related Art Including Information Disclosed Under 37 CFR 1.97 and 1.98

The prior art relates to vehicle lighting systems. More specifically, the prior art relates to indicia and lighting systems that can be affixed to emergency response vehicles such as police cars, ambulances, and fire trucks. Such emergency vehicle lighting systems typically provide audible and visible alert warnings, such as sirens and flashing lights to illuminate the vehicle during an emergency response. However, particularly on police cars, those emergency vehicle lighting systems can be extremely conspicuous. For example, the lighting systems typically include roof-mounted light bars that are unique to these emergency vehicles. Thus, it is difficult for a police car to travel unnoticed through a particular area. Thus, there is a need for a stealthier, less conspicuous lighting system for emergency vehicles. These roof-mounted light bars also have relatively limited capabilities. For example, the typical light bars are only capable of emitting a single pattern of multi-colored flashing lights. These lights are typically red and blue, which limits their utility beyond showing that the vehicle is present. Thus, there is also a need for an emergency vehicle lighting system that provides dynamic lighting options, for example to direct traffic and illuminate the environment surrounding the vehicle during emergency situations.

BRIEF SUMMARY OF THE INVENTION

An embodiment of the disclosure meets the needs presented above by generally comprising a motor vehicle having a perimeter wall including a rooftop. The motor vehicle has an interior bounded by the perimeter wall. The rooftop has a front edge, a rear edge, a first side edge, and a second side edge. A lighting assembly is coupled to the rooftop. The lighting assembly has a first setting comprising a first color that is emitted from the lighting assembly, a second setting comprising a second color and a third color that are emitted from the lighting assembly, and a third setting comprising a fourth color that is emitted from the lighting assembly. The first color, the second color, the third color, and the fourth color are each different colors with respect to each other. A control panel is coupled to the vehicle and operationally coupled to the lighting assembly. The control panel is actuated to select the first setting, the second setting, or the third setting of the lighting assembly. The control panel is positioned within the interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description refers to the annexed drawings wherein.

DETAILED DESCRIPTION OF THE INVENTION

Figure 1:
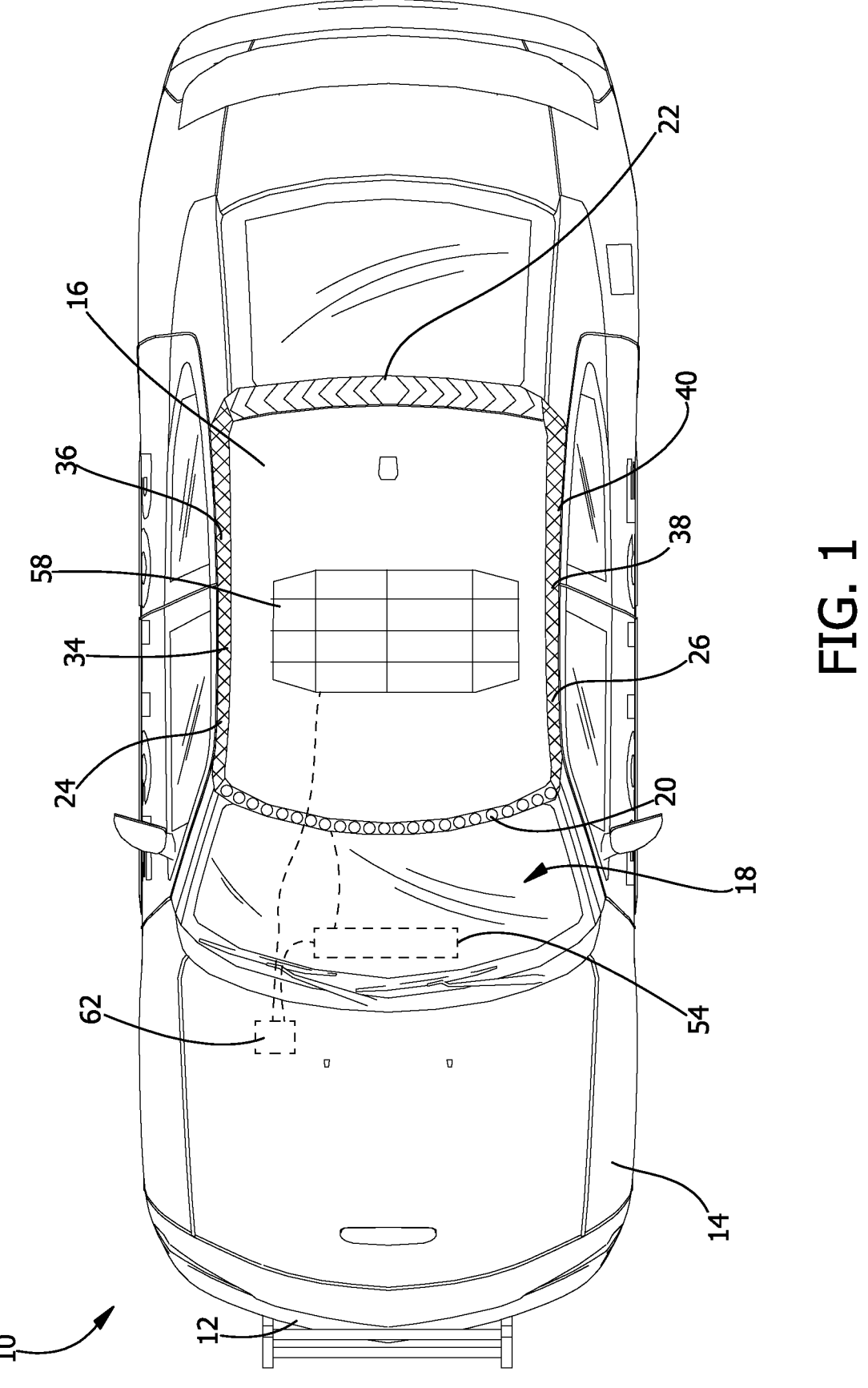
FIG. 1 is a top view of an emergency vehicle lighting system according to an embodiment of the disclosure.
Figure 2:
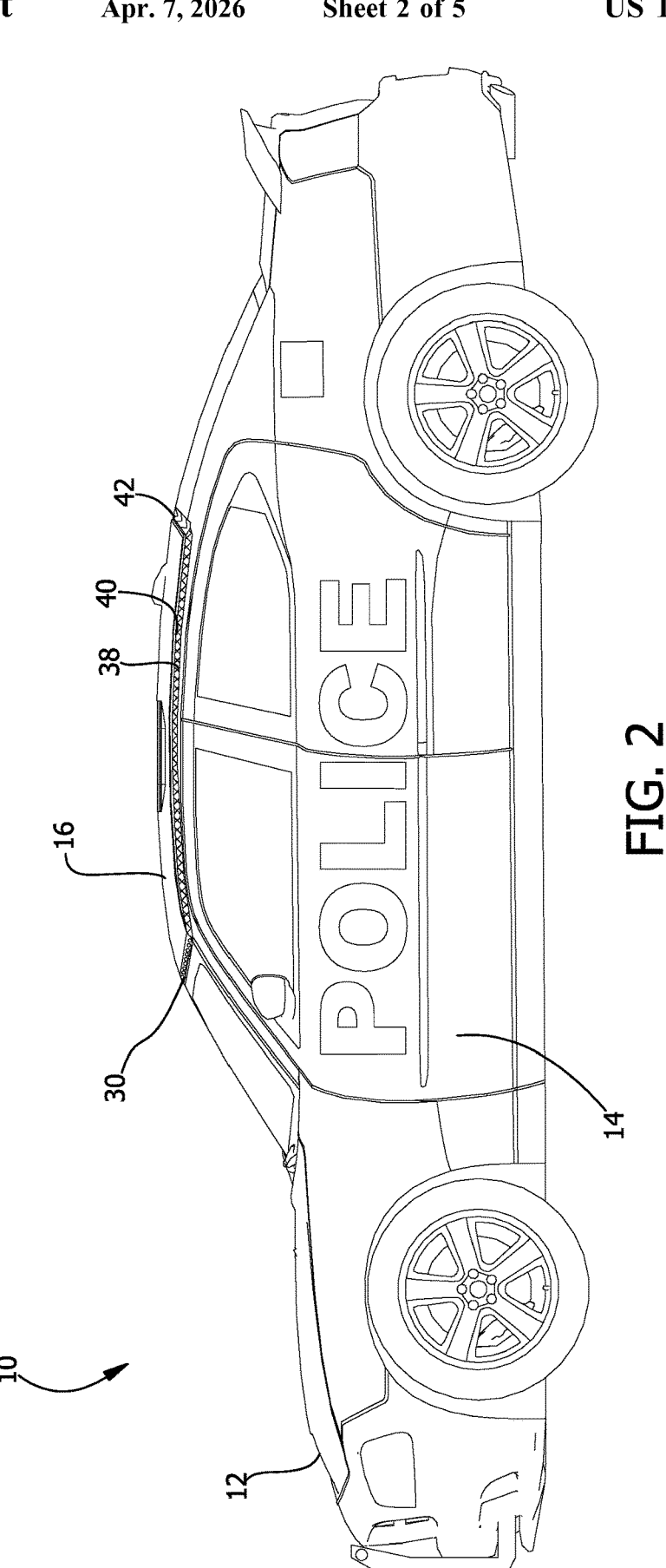
FIG. 2 is a side view of an embodiment of the disclosure.

With reference now to the drawings, and in particular to FIGS. 1 through 5 thereof, a new vehicle lighting system embodying the principles and concepts of an embodiment of the disclosure and generally designated by the reference numeral 10 will be described.

As best illustrated in FIGS. 1 through 5, the emergency vehicle lighting system 10 generally comprises a motor vehicle 12 having a perimeter wall 14 including a rooftop 16. The motor vehicle 12 has an interior 18 bounded by the perimeter wall 14. The rooftop 16 has a front edge 20, a rear edge 22, a first side edge 24, and a second side edge 26.

A lighting assembly 28 is coupled to the rooftop 16. The lighting assembly 28 may include a first setting comprising a first color that is emitted from the lighting assembly 28. For example, the first color may be white. The lighting assembly 28 may also have a second setting comprising a second color and a third color that are emitted from the lighting assembly 28. For example, the second color may be red, and the third color may be blue. The lighting assembly 28 may also have a third setting comprising a fourth color that is emitted from the lighting assembly 28. For example, the fourth color may be yellow.

Figure 3:
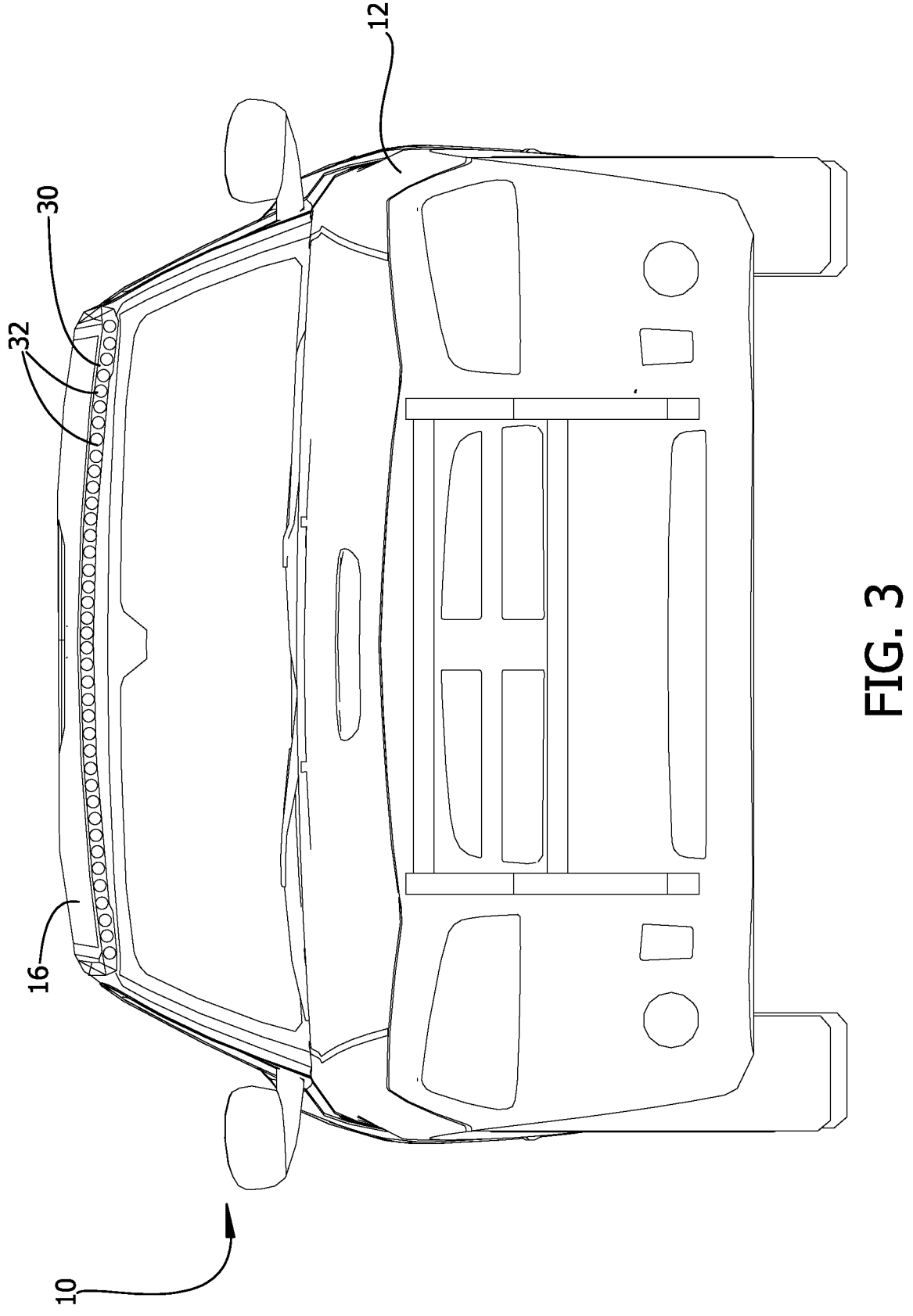
FIG. 3 is a front view of an embodiment of the disclosure.

Embodiments of the lighting assembly 28 may generally comprise a front light strip 30 that is coupled to the front edge 20. The front light strip 30 may emit, individually or in combination, the first color, the second color, or the third color. As shown in FIGS. 1 and 3, the front light strip 30 may comprise a row of round lights 32 that is aligned along the front edge 20. In other embodiments, the front light strip 30 may include a row of lights having an alternative shape.

A first side light strip 34 may be coupled to the first side edge 24. The first side light strip 34 may emit the first color. In the embodiments shown in FIGS. 1 and 2, the first side light strip 34 comprises a first row of x-shaped lights 36 that is aligned along the first side edge 24. In other embodiments, the first side light strip 34 may comprise a row of circular or round lights, a row of triangular lights, or any other shaped lights that are aligned along the first side edge 24.

A second side light strip 38 is coupled to the second side edge 26. The second side light strip 38 may emit the first color. The second side light strip 38 may comprise a second row of x-shaped lights 40 that is aligned along the second side edge 26. Like the first side light strip 34, alternative embodiments of the second side light strip 38 may comprise a row of circular or round lights, a row of triangular lights, or any other shaped lights that are aligned along the second side edge 26.

Figure 4:
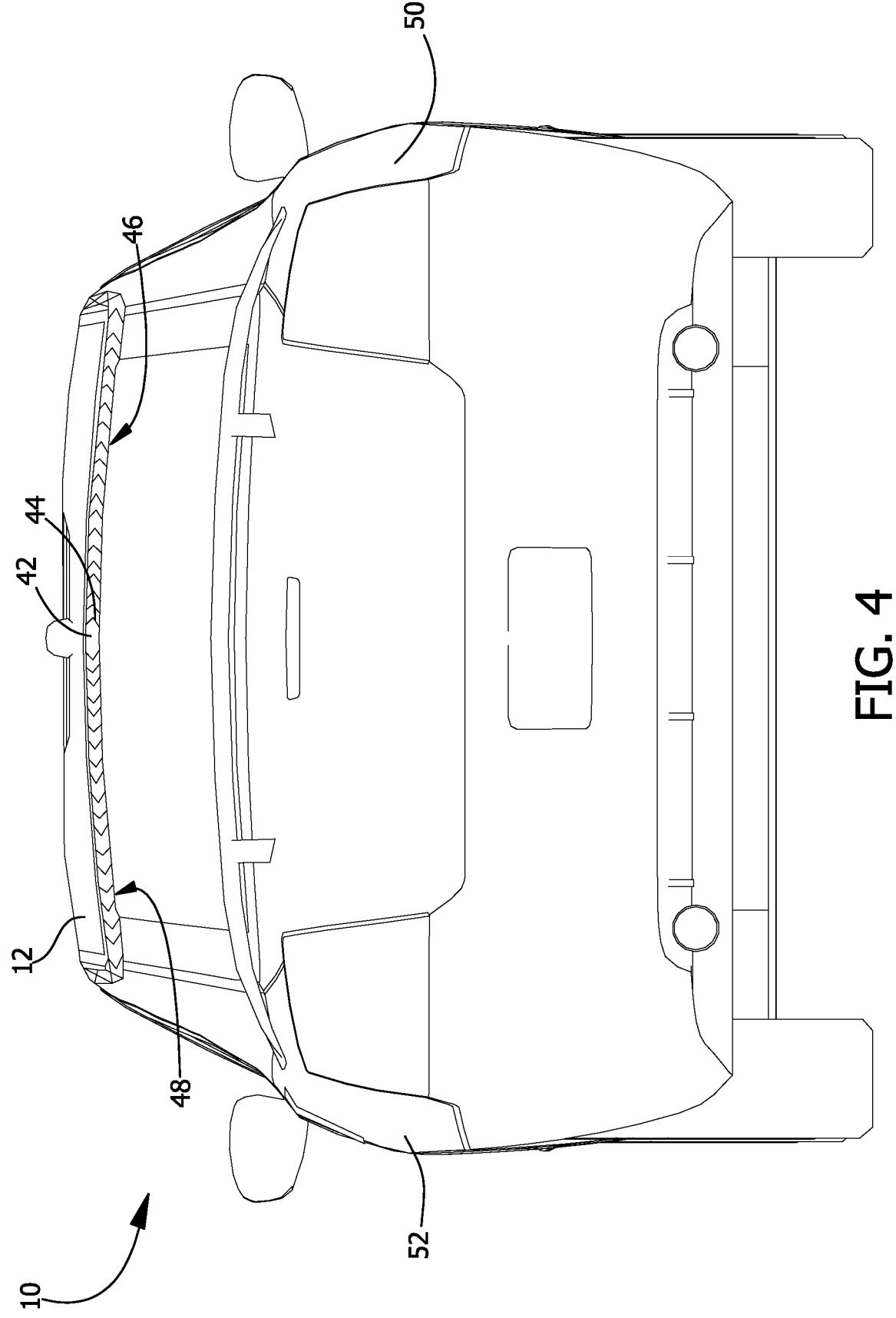
FIG. 4 is a back view of an embodiment of the disclosure.
Figure 5:
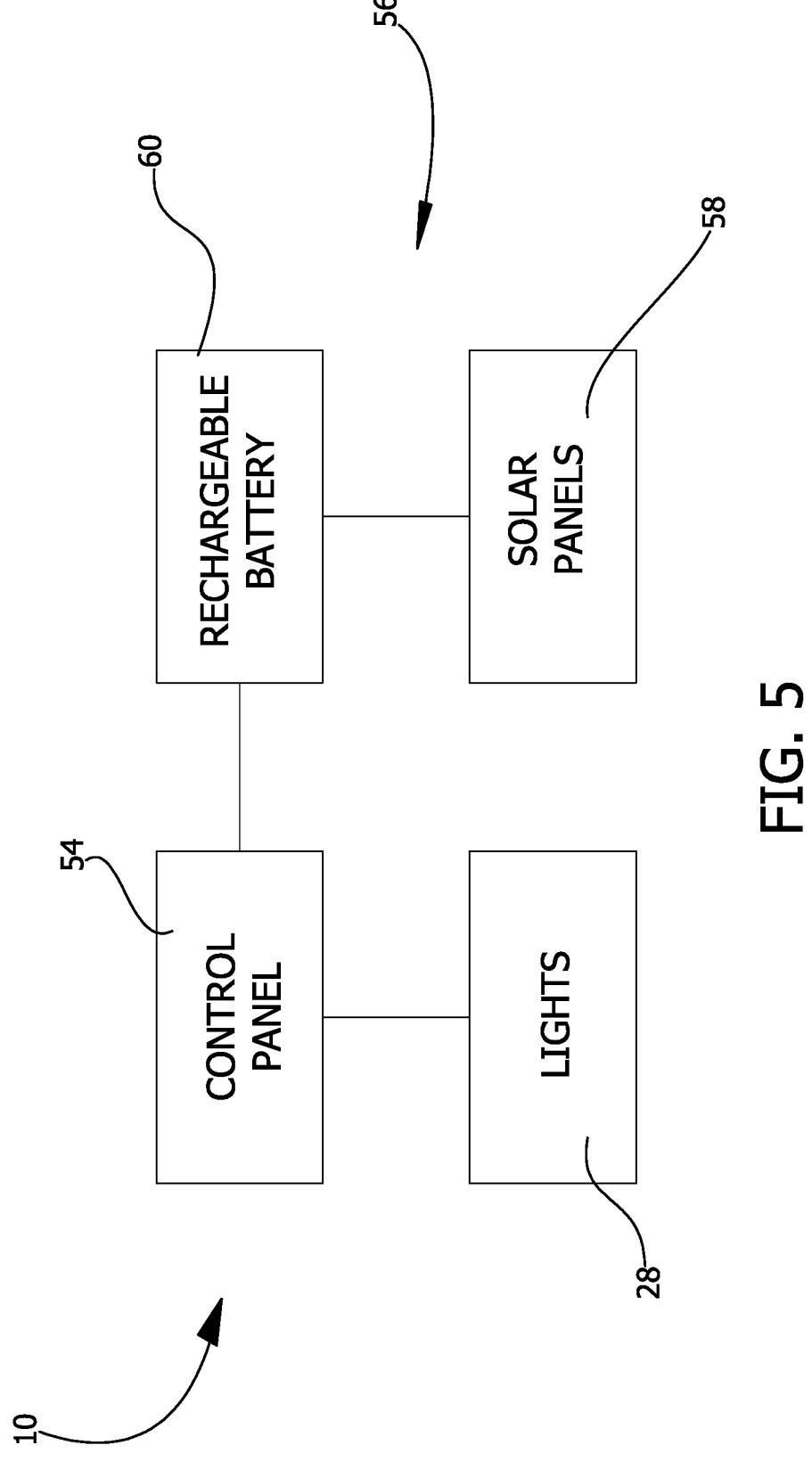
FIG. 5 is a block diagram view of an embodiment of the disclosure.

A rear light strip 42 is coupled to the rear edge 22. The rear light strip 4 may emit, individually or in combination, the first color, the second color, the third color, or the fourth color. In the embodiments shown in FIGS. 1 and 4, the rear light strip 42 generally comprises a row of arrow shaped lights 44 that is aligned along the rear edge 22. The row of arrow shaped lights 44 may include a first half 46 and a second half 48. As shown in FIG. 4, the first half 46 is generally on a right side 50 of the rear edge 22 and the second half 48 is generally on a left side of the rear edge. The row of arrow shaped lights 44 on the first half 46 point toward the right side 50 and the row of arrow shaped lights 44 on the second half 48 point toward the left side 52.

The various light settings may be used for different purposes. For example, each of the front light strip 30, the first side light strip 34, the second side light strip 38, and the rear light strip 42 may simultaneously emit the first color when the lighting assembly 28 is operating in the first setting. The lighting assembly 28 can accordingly be used in the first setting to illuminate an area surrounding the motor vehicle 12. For example, if the motor vehicle 12 is a police car responding to a crime scene, the first setting can be used to provide a bright light that completely surrounds the motor vehicle 12 and illuminates the crime scene.

In the second setting, each of the front light strip 30 and the rear light strip 42 may emit the second and third colors. For example, when the motor vehicle 12 is travelling to respond to an emergency, the lighting assembly 28 can operate in the second setting to provide a visual alarm. If the motor vehicle 12 is a police car, the second setting of the lighting assembly 28 can be used in place of the standard emergency lighting, providing a flashing pattern of red and blue lights to indicate that the police car is in route to a crime scene or other emergency.

When the lighting assembly 28 is operating in the third setting, the rear light strip 42 may emit the fourth color. For example, the third setting may further include a first sub-setting and a second sub-setting. In each the first and second sub-settings, either of the first half 46 or second half 48 of the row of arrow shaped lights 44 may be illuminated whereby the rear light strip 42 is configured to selectively direct traffic toward the right side 50 and the left side 52. For example, in the first sub-setting, the first half 46 of the row of arrow shaped lights 44 may emit the fourth color thereby directing traffic toward the right side 50 of the motor vehicle 12. In the second sub-setting, the second half 48 of the row of arrow shaped lights 44 may emit the fourth color thereby directing traffic toward the left side 52 of the motor vehicle 12.

A control panel 54 is coupled to the motor vehicle 12 and operationally coupled to the lighting assembly 28. The control panel 54 is actuated to select the first setting, the second setting, or the third setting of the lighting assembly 28. As shown in FIG. 1, the control panel 54 may be positioned within the interior 18 of the motor vehicle 12.

In some embodiments, a power supply 56 may be coupled to the motor vehicle 12. The power supply 56 is electrically coupled to the lighting assembly 28 and to the control panel 54. The power supply 56 provides a source of power for the lighting assembly 28 so that the lighting assembly 28 can function without using power from the motor vehicle 12 itself, for example by draining the car battery of the motor vehicle. In the embodiment depicted in FIGS. 1 and 5, the power supply 56 may generally include a solar panel 58 that is mounted to the rooftop 16 and a battery 60 that is operationally coupled to the solar panel 58. The battery 60 is coupled to the motor vehicle 12.

In use, the lighting assembly 28 can replace the standard rooftop-mounted bar lighting systems on emergency vehicles. Because each of the front 30, rear 42, first side 34, and second side 38 light strips may comprise planar sheets of lights, the motor vehicle 12 will also be less conspicuously identifiable as police car when the lighting assembly 28 is not activated. For example, each of the front 30, rear 42, first side 34, and second side 38 light strips may comprise planar sheets of light emitting diodes that are aligned along each edge of the rooftop 16.

Because the light assembly 28 has multiple dynamic lighting settings, the emergency vehicle lighting system 10 can also provide more utility than the standard emergency vehicle lighting systems. For example, as explained above, the first setting can be used to provide illumination of an area where the motor vehicle 12 is being used. In the first setting, the lighting assembly 28 may emit light from each side of the motor vehicle 12 to illuminate the entire area surrounding the motor vehicle 12. The second setting can be used to alert nearby individuals that the motor vehicle 12 is responding to a situation. In the second setting, the lighting assembly 28 can provide the red and blue flashing light patterns that individuals associate with emergency vehicle responses. The third setting can be used to direct traffic, for example when the motor vehicle 12 is responding to a car crash and needs to divert traffic out of a particular lane. In the third setting, the lighting assembly 28 can selectively direct traffic to the right 50 or left 52 side of the motor vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lighting system for a law enforcement vehicle, the lighting system comprising:

a motor vehicle having a perimeter wall including a rooftop, the motor vehicle having an interior bounded by the perimeter wall, the rooftop having a front edge, a rear edge, a first side edge, and a second side edge;

a lighting assembly being coupled to the rooftop, the lighting assembly having a first setting comprising a first color being emitted from the lighting assembly, the first color being white, the lighting assembly having a second setting comprising a second color and a third color being emitted from the lighting assembly, the second color being red, the third color being blue, the lighting assembly having a third setting comprising a fourth color being emitted from the lighting assembly, the fourth color being yellow, the lighting assembly comprising:

a front light strip being coupled to the front edge, the front light strip emitting individually or in combination the first color, the second color, or the third color, the front light strip comprising a row of round lights being aligned along the front edge;

a first side light strip being coupled to the first side edge, the first side light strip emitting the first color, the first side light strip comprising a first row of x-shaped lights being aligned along the first side edge;

a second side light strip being coupled to the second side edge, the second side light strip emitting the first color, the second side light strip comprising a second row of x-shaped lights being aligned along the second side edge;

a rear light strip being coupled to the rear edge, the rear light strip emitting individually or in combination the first color, the second color, the third color, or the fourth color, the rear light strip comprising a row of arrow shaped lights being aligned along the rear edge, the row of arrow shaped lights including a first half and a second half, the first half being on a right side of the rear edge, the second half being on a left side of the rear edge, the row of arrow shaped lights on the first half pointing toward the right side, the row of arrow shaped lights on the second half pointing toward the left side;

wherein each of the front light strip, the first side light strip, the second side light strip, and the rear light strip emits the first color when the lighting assembly is operating in the first setting;

wherein each of the front light strip and the rear light strip emit the second and third colors when the lighting assembly is operating in the second setting;

wherein the rear light strip emits the fourth color when the lighting assembly is operating in the third setting, the third setting further including either the first half or second half being illuminated whereby the rear light strip is configured to selectively direct traffic toward the right side and the left side;

a control panel being coupled to the motor vehicle and operationally coupled to the lighting assembly, the control panel being actuated to select the first setting, the second setting, or the third setting of the lighting assembly, the control panel being positioned within the interior;

a power supply being coupled to the motor vehicle, the power supply being electrically coupled to the lighting assembly and to the control panel, the power supply comprising:

a solar panel being mounted to the rooftop; and a battery being operationally coupled to the solar panel, the battery being coupled to the motor vehicle.

* * * * *